United States Patent [19]

Campana et al.

[11] Patent Number: 5,481,612
[45] Date of Patent: Jan. 2, 1996

[54] PROCESS FOR THE AUTHENTICATION OF A DATA PROCESSING SYSTEM BY ANOTHER DATA PROCESSING SYSTEM

[75] Inventors: Mireille Campana, Clamart; François Allegre, Bicetre; David Arditti, Clamart; Jean Millot, Issy-Les-Moulineaux, all of France

[73] Assignee: France Telecom Establissement Autonome de Droit Public, France

[21] Appl. No.: 167,502

[22] Filed: Dec. 15, 1993

[30] Foreign Application Priority Data

Dec. 15, 1992 [FR] France .................................. 92 15099

[51] Int. Cl.$^6$ ........................................................ H04L 9/30
[52] U.S. Cl. ........................................ 380/25; 380/30
[58] Field of Search ................................... 380/23, 25, 30

[56] References Cited

U.S. PATENT DOCUMENTS

| | | | |
|---|---|---|---|
| 4,649,233 | 3/1987 | Bass et al. | 380/25 |
| 4,947,430 | 8/1990 | Chaum | 380/25 |
| 4,995,082 | 2/1991 | Schnorr | 380/30 |
| 5,001,752 | 3/1991 | Fischer | 380/30 |
| 5,140,634 | 8/1992 | Guillou et al. | 380/23 |
| 5,241,599 | 8/1993 | Bellovin et al. | 380/30 |
| 5,319,710 | 6/1994 | Attalla et al. | 380/23 |
| 5,347,580 | 9/1994 | Molua et al. | 380/25 |
| 5,349,642 | 9/1994 | Kingdon | 380/25 |
| 5,363,448 | 11/1994 | Koopman, Jr. et al. | 380/23 |
| 5,365,466 | 11/1994 | Hazard | 380/23 |

FOREIGN PATENT DOCUMENTS

| | | | |
|---|---|---|---|
| 8703977 | 7/1987 | WIPO | G06F 1/00 |
| 9114980 | 10/1991 | WIPO | G06F 1/00 |

*Primary Examiner*—Salvatore Cangialosi
*Attorney, Agent, or Firm*—Hayes, Soloway, Hennessey, Grossman & Hage

[57] ABSTRACT

A process is provided for authentication in a data processing system using a data processing terminal having a programmable memory. The terminal supplies to a server an identify code (ID), the server checks the identify code, and in the case of agreement, supplies a random number (ALEA-A) to the terminal. The terminal encodes the random number using a signature algorithm (B) defined by a secret key (SID), and supplies a first signed random number (ALEA-S) to the server, which applies a signature checking algorithm (T, B, C) to the number (ALEA-S). The identity code and an encrypted secret key (KID) are written into the memory. The secret key (SID) used for the signature of the random number is determined using a decrypting algorithm (INVA) using the encrypted secret key (KID) and a password (MP) supplied by the terminal user. Particular utility for the present invention is found in the area of data processing, although other utilities are also contemplated.

4 Claims, 2 Drawing Sheets

PROCESS FOR THE AUTHENTICATION OF A DATA PROCESSING SYSTEM BY ANOTHER DATA PROCESSING SYSTEM

BACKGROUND OF THE INVENTION

FIELD OF THE INVENTION

The invention relates to a process for the authentication of a data processing terminal equipped with a programmable memory by a data processing server.

This process can be applied to all data processing terminal types which can be modified by the addition of a PROM (programmable read only memory), EPROM (erasable programmable read only memory), RAM (random access memory) or EEPROM (electronically erasable programmable read only memory), in order to store said data and programs. This process can in particular be applied to a portable Minitel®.

BRIEF DESCRIPTION OF THE RELATED PRIOR ART

In existing data processing systems, ever increasing importance is being attached to the protection of the data. Thus, the quality of the data processing system decisively depends on the security of the data exchange within the system. Ever increasing efforts are being made in rendering secure the access to the system, i.e. the aim is to check whether the persons using the system are authorized to do so and said system must then refuse access to unauthorized persons.

A simple construction, which does not offer absolute security, consists of checking the access to the data processing system by the verification of a password known only to the authorized user and frequently changed in order to limit the possibility of unauthorized users discovering said password. However, there are considerable risks of the passwords being found or intercepted by unauthorized persons wishing to use the data processing system. Moreover, the passwords chosen by the users are often easy to find by an exhaustive search. However, usually use is made of random passwords generated by data processing systems are often more difficult to remember. The exhaustive search using a password dictionary is often possible without any attempted connection, provided that it is possible to read the file of encrypted passwords.

Another way of rendering secure a data processing function consists of encoding/decoding the informations transmitted between the system. This encoding/decoding process is evermore frequently used. It generally uses ancillary devices normally connected to the terminals. Examples of these devices are pocket calculators, tokens, chip cards or videotex authentication.

The most widely encountered encoding/decoding devices use chip cards. Therefore they require a plurality of card readers, each reader being connected to one of the terminals of the data processing system.

Therefore such a data processing system suffers from the main disadvantage of being expensive, because it requires the connection of one reader per terminal. In addition, this memory card system is only usable on the basis of certain terminals. A system of this type using chip cards for its security is described in European Patent EP-A-400,441.

In addition, a process for rendering secure exchanges between a videotex terminal and a server is described in European Patent EP-A-317,400. This process suffers from the disadvantage of requiring an additional box plugged into the computer peripherals and terminals power outlet of the videotex terminal.

SUMMARY OF THE INVENTION

The present invention aims at obviating the disadvantages of the processes described hereinbefore and permits the authentication by signature of a data processing system terminal and more particularly a portable videotex terminal known under the trade name portable Minitel®. Thus, it permits the authentication of a portable Minitel® without using any supplementary equipment having to be connected to the Minitel® and whose electric power consumption is generally too high to be used in an optimum manner.

To this end, the invention relates to a process for the authentication of a first data processing system by a second data processing system, in which the first system supplies to the second an identity code, the second system checks this identity and, in the case of agreement, supplies the first system with a random number, the first system encodes the random number with the aid of a signature algorithm defined by a secret key and supplies said first signed random number to the second system, which applies a signature checking algorithm.

This process is characterized in that the first data processing system is a data processing terminal equipped with a memory which can be programmed and which can record data and in which are entered the identity code and an encrypted key, the secret key used for the signature of the random number being determined with the aid of a decrypting algorithm using the encrypted key and a password supplied by the user to the terminal.

Advantageously, the checking algorithm consists of a transformation, by a conversion processing operation, of the identity code into the secret code, a signature of the random number by a signature algorithm defined by the secret key for supplying a second signed random number, called the reference signature and a comparison of the reference signature with the first signed random number from the terminal.

According to an embodiment of the invention, the encrypted key is determined by the encrypting of the secret key by an encrypting algorithm using a password.

On changing one password to another, the process consists of encrypting the secret key by means of an encrypting algorithm and the new password in order to supply a new encrypted key.

Thus, the process according to the invention makes it possible to provide services identical to those of a process using the chip card, whilst not requiring card readers.

The data processing system used for performing the process has a data processing terminal connected to a server. The data processing terminal has a memory able to store programs and data. This memory can be a RAM, EEPROM, EPROM or PROM.

Unlike the chip card, such a data processing terminal has no secret area in which a secret key can be stored. In addition, the secret key is encrypted before being stored in the programmable memory equipping the data processing terminal. The encrypting of this secret key takes place on the basis of an encrypting algorithm used with the aid of a password known to the user. This password does not transit the communication means (e.g. transmission line) connecting the terminal to the data processing system server. Moreover, this password is not entered in the terminal memory. It can also not be found again by exhaustive testing carried out by a person having had access to the content of the memory.

In the following description, the process according to the invention will be described in its application to the portable Minitel®, which is equipped with a memory. However, the terms Minitel® and terminal will be used in a random manner.

DETAILED DESCRIPTION OF PREFERRED EMBODIMENTS

Figure 1:
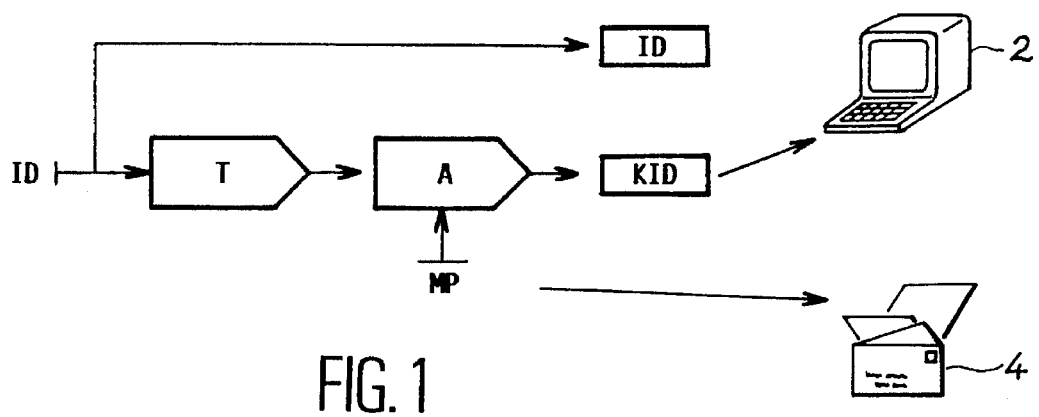
FIG. 1 is a functional block diagram for the customization of the PROM, i.e. the determination of the secret key and the encrypted secret key.

FIG. 1 shows the functional diagram of the determination operation of the secret key SID, as well as the encrypted secret key KID. The secret key SID is recalculatable by the server by means of the process T. The memory of the terminal 2 stores the secret key in its encrypted form KID.

As shown in FIG. 1, the secret key SID is determined on the basis of the identity code ID. This identity code is a nonsecret code representative of the user requesting access to the data processing system. In practice, this identity code can be the name of the user.

The determination of this secret key can take place on the basis of various processing types. According to a first variant of the invention, said secret key SID can be determined with the aid of a data base in which each identity code ID is converted into a secret key BID.

According to a second variant, the secret key SID is determined with the aid of a diversification function having as variables to the identity code ID and a parent key stored in the server.

The customization phase of the data processing terminal takes place in a so-called customization system. An administrator enters the user's identity code ID in the keyboard of the personalization system. This identity code ID is then entered in the memory of the terminal 2. The customization system has the same processing means as the server. It is therefore able to determine the secret key SID on the basis of the identity code ID.

When the secret key SID has been determined, the customization system puts into effect an encrypting algorithm A using a password HIP chosen by the administrator and entered into the customization system by entry on its keyboard.

According to a variant, the password MP is transmitted to the user by a secure channel 4, which can e.g. be a secret envelope.

According to another variant, the password chosen for the determination of the secret key SID is a fictional password which, when the keys SID and KID have been determined, will be changed to the user's own password.

This encrypting algorithm A leads to the determination of the encrypted secret key KID, which is stored in the memory of the terminal 2.

According to a preferred embodiment of the invention, when the customization operation of the memory described hereinbefore has taken place, there is a checking operation for the keys KID and SID by signatures of a random number equal to zero and called ALEA-0. These signatures take place on the one hand in the terminal and on the other in the customization system with the aid of which the administrator has determined the said keys KID and SID. These ALEA-0 are signed on the one hand by the personalization system and on the other by the terminal (as described in the remainder of the text). They are then compared with one another. When they are equivalent, it is considered that the customization operation is ended and that the authentication procedure is then possible.

Figure 2:
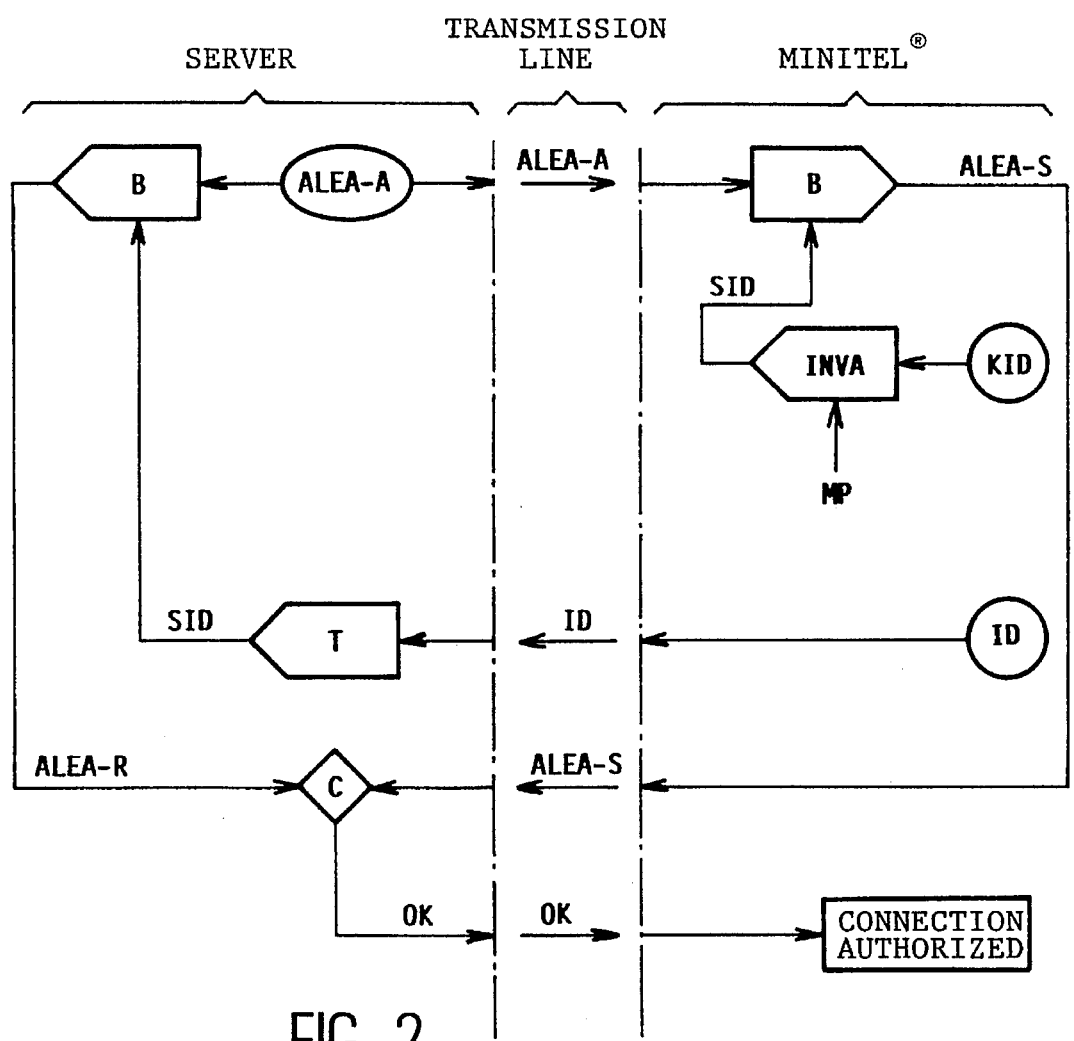
FIG. 2 is a functional block diagram of the authentication process according to the invention.

FIG. 2 shows the various operations of the authentication process according to the invention. The connection request consists of supplying the terminal identity code ID to the server which, after verification of said identity code, generates a random number ALEA-A and transmits it to the terminal.

On receiving this random number ALEA-A, the terminal performs a signature algorithm B consisting of signing the random number ALEA-A with the aid of the secret key SID in its encrypted form KID. Thus, as explained hereinbefore, the secret key is stored in the memory in its encrypted form KID. This encrypted secret key KID is consequently decrypted in the terminal by a decrypting algorithm INVA. This decrypting algorithm INVA is the reverse algorithm to the encrypting algorithm A. It has as its parameter the user's password MP. Thus, at the output of said algorithm INVA is obtained the secret key SID used jointly with the signature algorithm B for signing the random number ALEA-A. This signed random number is called ALEA-S.

This signed random number ALEA-S is then transmitted to the server, which checks the signature of the random number ALEA-A by a test of comparing the signed random number ALEA-S with a result (or reference signature ALEA-R), which it has determined itself. Thus, when the server has generated the random number ALEA-A which it has transmitted to the terminal, it performs a signature operation for the random number ALEA-A considered as the reference signature ALEA-R. This reference signature operation is performed by means of the signature algorithm B and the secret key SID recalculated by means of the process T by the server.

A comparison algorithm C then makes it possible to check whether the signed random number ALEA-S and the reference signature are equivalent. If this equivalence is proved, the server supplies the terminal with a connection agreement message. This message is designated OK and signifies to the user that he is authorized to connect to the server.

However, if the equivalence between the random number ALEA-S and the reference signature ALEA-R is not proved, the message OK is not sent and the user is not authorized to connect to the server.

The encrypting and signature algorithms A,B respectively used in the above-described process are not more specifically described in the present text, because they are known to the expert.

For the user, the authentication according to the process of the invention takes place in a quasi-transparent manner. Thus, when the user requests a connection of his terminal to the server. The receives on his terminal a random number from said server. The user program contained in the memory then requests him to reenter his password MP. This user program recrypts the encrypted secret key KID and signs the random number ALEA-A supplied by the server. This signature is then Bent to the server, without any further intervention on the part of the user.

Figure 3:
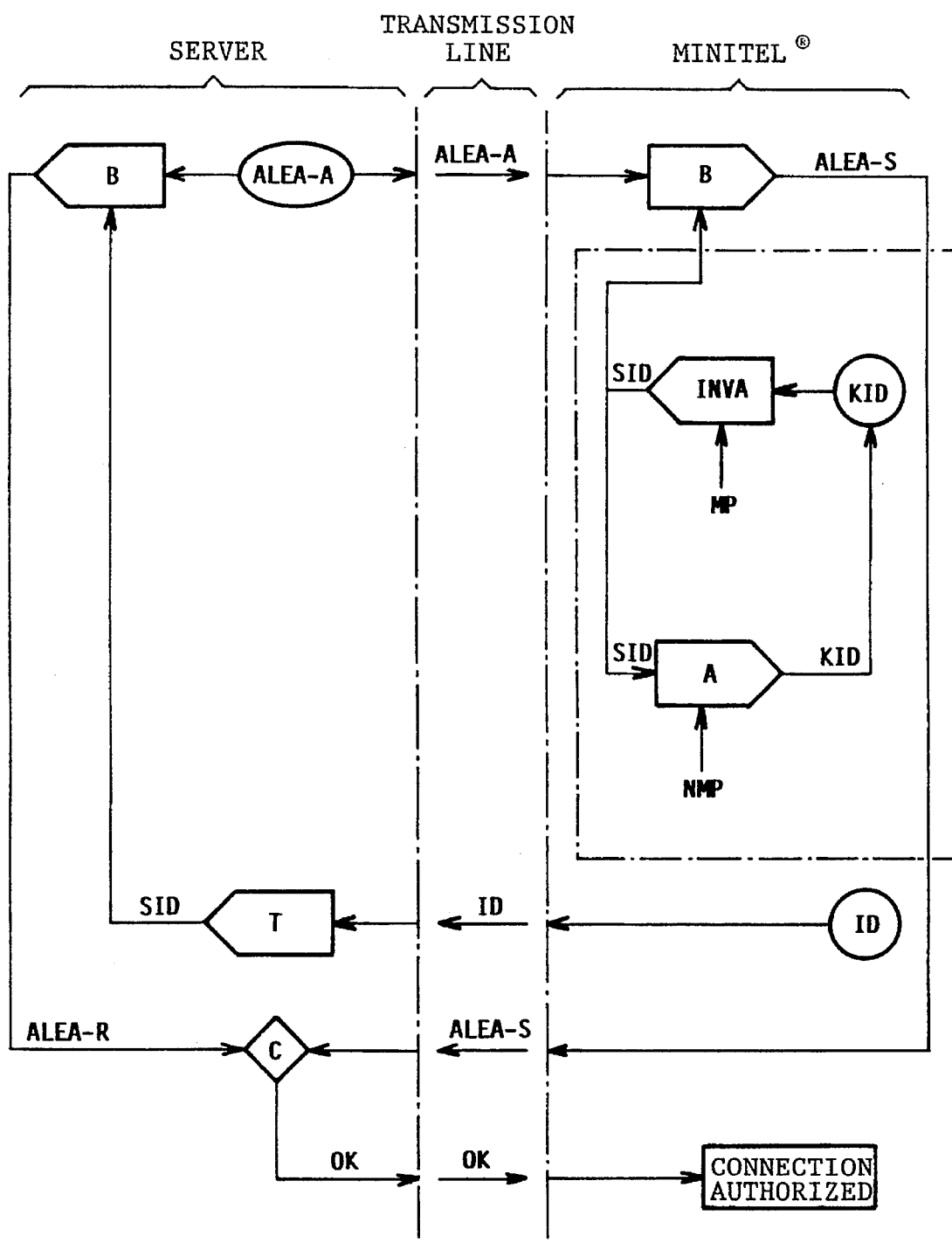
FIG. 3 is a functional block diagram of the process according to the invention in the case of a password change.

FIG. 3 is the functional diagram of the process according to the invention, in the particular case of a change of password MP. Thus, the process according to the invention has the particular advantage of permitting a change of password (represented by the mixed line block in FIG. 3) in a safe manner, because said change is performed after a successful connection ensuring the validity of the secret key SID. More specifically, when the connection between the terminal and the server has been established, the encrypted secret key KID is decrypted on the basis of the decrypting algorithm INVA and on the basis of the first password MP (i.e. the password which it is wished to modify). Thus, the secret key SID has been found and which is used by the encrypting algorithm A with the second password NMP (i.e. the new password) in order to create a new encrypted form of the secret key. This new encrypted form will be entered into the memory in the place of the old encrypted form of the secret key KID.

Thus, this process ensures the security of the password which remains "local", i.e. at no time is it supplied to the transmission means connecting the terminal and the server and where listening in would be possible.

This description makes it clear that a possible listening in on the transmission means between the terminal and the server does not make it possible to determine the password or the different keys, because the informations circulating on said transmission means do not make it possible to recalculate these keys and passwords by reverse algorithms or any other means.

It is also pointed out that the known, chip card-based authentication system and the authentication system based on a terminal equipped with a PROM can be compatible in the case where the PROM and the chip card have the same algorithm.

We claim:

1. A process for authentication of a first data processing system by a second data processing system, and comprising, supplying an identity code (ID) from said first system to said second system to permit said second system to check said identity code for agreement, supplying a random number (ALEA-A) from said second system to said first system if said agreement is found whereby to permit said first system to encode said random number using a signature algorithm (B) using a secret key (SID) whereby to generate a first signed random number (ALEA-S), and supplying said first signed random number from said first system to said second system to permit said second system to apply a signature checking algorithm (T,B,C) to said first signed random number; and wherein, the first system includes a data processing terminal including a memory for being programmed and for storing data, said identity code and an encrypted secret fey (KID) are stored in said memory, and the secret key used for the signature of the random number is determined with aid of a decrypting algorithm (INVA) using the encrypted secret key (KID) and a password (MP) supplied by a user to the terminal.

2. A process according to claim 1, wherein the checking algorithm comprises a transformation, by a conversion treatment (T), of the identity code into the secret key a signature of the random number by a signature algorithm (B) defined by the secret key whereby to supply a reference signature (ALEA-R) which is a second signed random number, and a comparison of the reference signature with the first signed random number from the terminal.

3. A process according to claim 1, wherein the encrypted key is determined by encrypting the secret key with an encrypting algorithm (A) using a password chosen by default.

4. A process according to claim 1, and further comprising, changing the password to a new password (NMP), and encrypting the secret key by means of an encrypting algorithm (A) and the new password whereby to supply a new encrypted key.

* * * * *